United States Patent
Waguespack et al.

(10) Patent No.: US 10,851,320 B2
(45) Date of Patent: Dec. 1, 2020

(54) PRODUCT COMPOSITIONS FOR DIMETHOXYMETHANE OLIGOMERS MIXED WITH DISTILLATE FUELS

(71) Applicant: Lyondell Chemical Technology, L.P., Houston, TX (US)

(72) Inventors: James N. Waguespack, Spring, TX (US); Larry W. Arndt, Humble, TX (US); David S. Mannel, Humble, TX (US); Ha H. Nguyen, Houston, TX (US); Barbara Kimmich, Houston, TX (US)

(73) Assignee: Lyondell Chemical Technology, L.P., Houston, TX (US)

( * ) Notice: Subject to any disclaimer, the term of this patent is extended or adjusted under 35 U.S.C. 154(b) by 85 days.

(21) Appl. No.: 16/169,307

(22) Filed: Oct. 24, 2018

(65) Prior Publication Data

US 2019/0119590 A1 Apr. 25, 2019

Related U.S. Application Data

(60) Provisional application No. 62/576,995, filed on Oct. 25, 2017.

(51) Int. Cl.
*C10L 1/185* (2006.01)
*C10L 1/19* (2006.01)
(Continued)

(52) U.S. Cl.
CPC .......... *C10L 1/1852* (2013.01); *C10G 50/00* (2013.01); *C10L 1/026* (2013.01); *C10L 1/185* (2013.01);
(Continued)

(58) Field of Classification Search
CPC combination set(s) only.
See application file for complete search history.

(56) References Cited

U.S. PATENT DOCUMENTS

2008/0216390 A1* 9/2008 Tebben .................. C10L 1/026
44/307

FOREIGN PATENT DOCUMENTS

| CN | 103666598 A | 3/2014 |
| CN | 104119968 A | 10/2014 |

(Continued)

OTHER PUBLICATIONS

J Connemann et al.; Biodiesel in Europe 1998, Jul. 22, 1998, XP055538874, Brazil; Retrieved from the Internet: URL: https://biodiesel.org/reports/19980722_gen-100.pdf.
(Continued)

*Primary Examiner* — Ellen M McAvoy
*Assistant Examiner* — Chantel L Graham

(57) ABSTRACT

A composition comprising a distillate fuel, an oligomer portion comprising at least one dimethoxymethane oligomer, and a stabilizer comprising one or more alcohols. A composition comprising a distillate fuel, and an oligomer portion comprising at least one dimethoxymethane oligomer, DMMn, wherein n is less than 3 and/or greater than 4. A composition comprising a distillate fuel, and less than 10 volume percent of an oligomer portion, wherein the oligomer portion comprises at least one dimethoxymethane oligomer. A method comprising separating, from a mixture of DMMn oligomers, one or more DMMn fractions comprising oligomers of a desired chain length n, and combining a desired amount of one or more of the separated DMMn fractions with a distillate fuel to provide a fuel composition. A composition comprising a distillate fuel that includes renewable distillate fuel, DMMn and/or alcohol.

20 Claims, 1 Drawing Sheet

(51) Int. Cl.
*C10L 1/182* (2006.01)
*C10L 10/12* (2006.01)
*C10L 1/198* (2006.01)
*C10G 50/00* (2006.01)
*C10L 1/02* (2006.01)
C10L 10/14 (2006.01)

(52) U.S. Cl.
CPC ............... *C10L 1/1824* (2013.01); *C10L 1/19* (2013.01); *C10L 1/1981* (2013.01); *C10L 1/1985* (2013.01); *C10L 10/12* (2013.01); *C10L 10/14* (2013.01); *C10L 2200/0407* (2013.01)

(56) References Cited

FOREIGN PATENT DOCUMENTS

| | | |
|---|---|---|
| CN | 104388129 A | 3/2015 |
| CN | 104498114 A | 4/2015 |
| CN | 104479770 B | 5/2016 |
| CN | 106336912 A | 1/2017 |
| WO | 2012046169 A1 | 4/2012 |
| WO | WO-2012046169 A1 * | 4/2012 ............ C10L 1/1852 |

OTHER PUBLICATIONS

The International Search Report and Written Opinion for PCT/US2018/057292 dated Jan. 15, 2019.

* cited by examiner

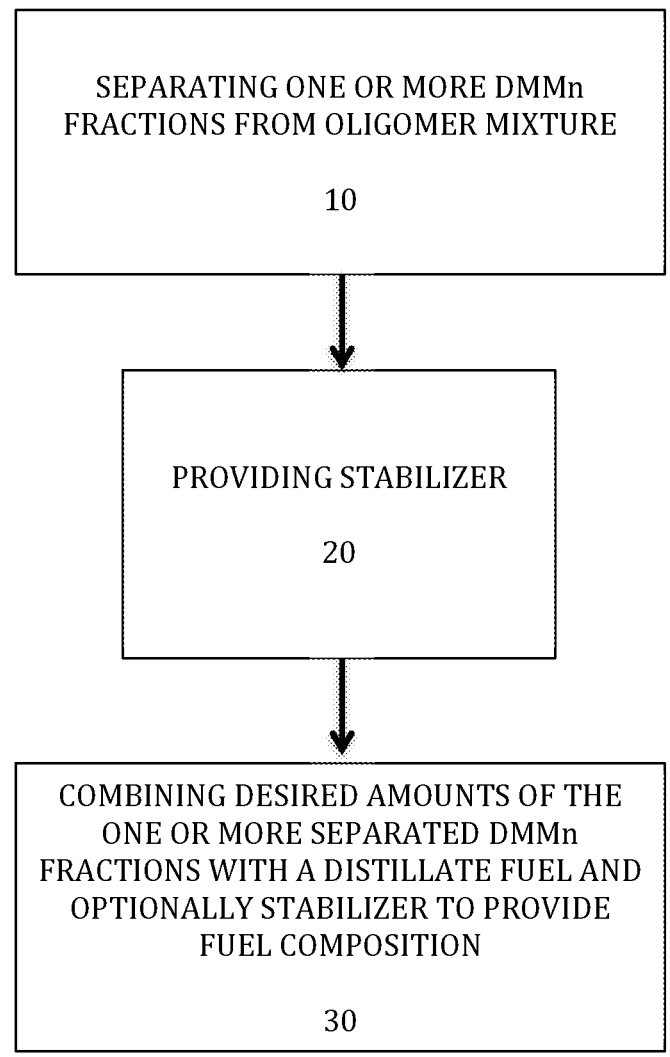

PRODUCT COMPOSITIONS FOR DIMETHOXYMETHANE OLIGOMERS MIXED WITH DISTILLATE FUELS

CROSS-REFERENCE TO RELATED APPLICATIONS

This application claims the benefit of priority to U.S. Provisional Application No. 62/576,995, filed on Oct. 25, 2017, which is incorporated here by reference in its entirety.

TECHNICAL FIELD

This disclosure relates to distillate fuel compositions comprising dimethoxymethane oligomers.

BACKGROUND

Distillate fuels exhibit characteristics including fungibility, pour point, flash point, cloud point, and cetane number. Fungibility relates to performance in fuel distribution and delivery systems. An indicator of fungibility is the increase of water phase volume when water is contacted with the fuel mixture. The pour point is the temperature at which a liquid becomes semi-solid and loses its flow characteristics. The flash point is the lowest temperature at which vapors of the material will ignite, when given an ignition source. The cloud point is the temperature below which wax in diesel or biowax in biodiesels forms a cloudy appearance. The cetane number is an indicator of the combustion speed of diesel fuel.

Dimethoxymethane oligomers, referred to herein as DMMn, may be blended with distillate fuels to reduce levels of harmful engine exhaust emissions, such as particulates, SOx, NOx and hydrocarbons, and increase levels of cetane of the resulting blended fuel. The absence of sulfur in DMMn may also reduce deleterious effects on combustion engine pollution control equipment. Conventionally, dimethoxymethane oligomers having a chain length of 3 or 4 are utilized to increase the cetane content of distillate fuels. However, addition thereof may reduce the fungibility of the resulting composition. Accordingly, there exists a need for product compositions comprising distillate fuels and DMMn's, wherein the product compositions retain acceptable properties or exhibit improved properties (e.g., fungibility, cloud point, pour point, flash point).

SUMMARY

Herein disclosed is a composition comprising a distillate fuel, an oligomer portion comprising at least one dimethoxymethane oligomer, and a stabilizer comprising one or more alcohols.

Also disclosed herein is a composition comprising a distillate fuel, and an oligomer portion comprising at least one dimethoxymethane oligomer, DMMn, wherein n is less than 3 and/or greater than 4.

Also disclosed herein is a composition comprising a distillate fuel, and less than 10 volume percent of an oligomer portion, wherein the oligomer portion comprises at least one dimethoxymethane oligomer.

Also disclosed herein is a method comprising separating, from a mixture of DMMn oligomers, one or more DMMn fractions comprising oligomers of a desired chain length n, and combining a desired amount of one or more of the separated DMMn fractions with a distillate fuel to provide a fuel composition.

Also disclosed herein is a fuel composition comprising: a distillate fuel, an oligomer portion comprising at least one dimethoxymethane oligomer (DMMn), and an alcohol having a low water solubility, wherein at least one of the distillate fuel and the alcohol is partially or wholly a renewable fuel component.

While multiple embodiments are disclosed, still other embodiments will become apparent to those skilled in the art from the following detailed description. As will be apparent, certain embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWING

The following FIGURE illustrates an embodiment of the subject matter disclosed herein. The claimed subject matter may be understood by reference to the following description taken in conjunction with the accompanying FIGURE, in which:

The FIGURE is a schematic of a method I for producing a fuel composition, according to an embodiment of this disclosure.

DETAILED DESCRIPTION

Overview

This disclosure relates to product compositions comprising dimethoxymethane oligomers. This disclosure further relates to product compositions comprising dimethoxymethane oligomers and distillate fuels. This disclosure still further relates to product compositions comprising dimethoxymethane oligomers and distillate fuels, wherein the dimethoxymethane oligomers have specific chain length(s), wherein the product composition comprises less than a maximum total amount of dimethoxymethane oligomers, and/or wherein the product composition further comprises a stabilizer comprising one or more alcohols.

Dimethoxymethane oligomers, also called polyoxymethylene dimethyl ethers, have the structure (1):

where n represents the number of repeating groups in the oligomer. Dimethoxymethane oligomers may also be referred to by the abbreviation DMMn, where n represents the number of repeating groups in the oligomer.

The utilization of dimethoxymethane oligomer (DMMn) blends in distillate fuels, as described herein, may result in compositions providing benefits, including, without limitation, reduced levels of harmful engine exhaust emissions such as particulates, SOx, NOx and hydrocarbons, and higher levels of cetane. The absence of sulfur in DMMn may also reduce deleterious effects on combustion engine pollution control equipment. In embodiments, the at least one dimethoxymethane oligomer in the fuel is derived, partially or wholly, from renewable material, and/or otherwise contains renewable material.

In embodiments, a composition according to this disclosure comprises a distillate fuel (also referred to as a distillate fuel portion or distillate fuel component of the composition)

and at least one dimethoxymethane oligomer, DMMn (also referred to as an oligomer portion or oligomer component of the composition). Any distillate fuel may be utilized in the compositions of this disclosure, for example a motor fuel. In embodiments, the distillate fuel comprises diesel, jet fuel, kerosene, or a combination thereof.

The compositions of this disclosure may comprise a specific total amount (e.g., volume percentage) of DMMn oligomers. For example, in embodiments, a composition according to this disclosure comprises a distillate fuel, and less than a maximum desired volume percent of at least one dimethoxymethane oligomer, DMMn. In embodiments, the composition comprises less than or less than or equal to 20, 15, 10, 9, 8, 7, 6, 5, 4, 3, 2, or 1 volume percent of at least one dimethoxymethane oligomer, DMMn, wherein volume percent is defined as a ratio of the volume of the oligomer to the sum of the volumes of the distillate fuel, any additional components (e.g., stabilizer, as described below), and the oligomer.

Product compositions comprising percentages of DMMn in accordance with the aforementioned volume percentage in blends of DMMn in distillate fuels may provide enhanced fungibility and properties more similar to conventional diesel (i.e., diesel not containing any DMMn) than compositions comprising higher volume percentages of DMMn. Utilization of a lower overall volume percentage of oligomers (e.g., less than 10 vol. %) may result in lower production cost and/or an easier path to regulatory approval than that of compositions comprising higher overall volume percentages of oligomers.

In embodiments, a composition according to this disclosure comprises a specific distribution and/or amount of DMMn oligomers. Specific ranges of chain lengths (n) of the dimethoxymethane oligomers (DMMn) may be incorporated to provide a composition of this disclosure.

In embodiments, a composition according to this disclosure comprises an oligomer portion comprising DMM5+. Without wishing to be limited by theory, inclusion of higher levels of oligomers having n greater than 4 can increase the cetane content of the composition, while retaining other properties appropriate for blending with a distillate fuel, such as diesel. Oligomers of higher n (e.g., n greater than 5, 6, or 7) may be limited in order to maintain certain product properties, such as cloud point and pour point. Compositions comprising DMM5+ according to this disclosure, may also comprise oligomers with n less than or equal to 4, such as DMM1, DMM2, DMM3 and/or DMM4, due to, for example, lower production cost, but content of the lower chain length (n) oligomers (e.g., DMM1, DMM2, DMM3, and/or DMM4) may be reduced to minimize the potential negative impact thereof on flash point, cetane, and/or fungibility.

For example, in embodiments, a composition according to this disclosure comprises at least one DMMn wherein n is greater than 4, i.e., DMM5+. In embodiments, the composition comprises less than 2, 1, or 0.5 volume percent DMM5+. In embodiments, the oligomer portion of the composition comprises or consists essentially of DMMn selected from DMM5 along with DMM2, DMM3, and/or DMM4. Such compositions may comprise, for example, less than or equal to 5, 10 or 20 volume percent of an oligomer portion comprising DMM2 in addition to DMM3, DMM4 and/or DMM5.

In embodiments, the oligomer portion of a composition according to this disclosure comprises or consists essentially of DMM3, DMM4, or a combination thereof. In embodiments, the oligomer portion of a composition according to this disclosure comprises a desired ratio of DMM3 to DMM4 and/or DMM5. Without wishing to be limited by theory, higher amounts of DMM3 may enhance cloud point for use of the composition in colder climates, while DMM4 and/or DMM5 may be utilized to increase the cetane content.

In embodiments, the oligomer portion of the composition comprises or consists essentially or primarily of DMM2-5 (i.e., oligomers having chain lengths n of equal to or greater than 2 and less than 6), DMM2-4 (i.e., oligomers having chain lengths n of 2 and/or 3 and/or 4), DMM3 (i.e., oligomers having chain lengths n of 3), DMM4 (i.e., oligomers having chain lengths n of 4), or a combination thereof. In embodiments, the composition comprises from 0 to 0.1, from 0 to 0.5, or from 0 to 1.0 volume percent DMM2; from 0 to 1.0, from 0 to 5.0, or from 0 to 25.0 volume percent DMM3; from 0 to 1.0, from 0 to 5.0, or from 0 to 25.0 volume percent DMM4; from 0 to 0.5, from 0 to 1.0, or from 0 to 2.0 volume percent DMM5; or a combination thereof. As described in more detail hereinbelow, desired oligomer fractions having a specific chain length (e.g., DMM2+, DMM3, DMM4, DMM5, DMM2, DMM3-4, DMM3-6, DMM2-5, DMM3-5, etc.) may be separated from a mixture of DMMn oligomers, and combined to provide a fuel composition of this disclosure having specific amounts and/or a specific distribution of DMMn oligomers of desired lengths.

In embodiments, a composition according to this disclosure comprises from 5 vol. % to 10 or 20 vol. % of a DMMn oligomer fraction, with less than 1.0 vol. % provided by DMM2, less than 2.0 vol. % provided by DMM5, and the remainder of the volume percentage of the oligomer fraction being provided by DMM3 and/or DMM4.

In embodiments, a herein-disclosed composition further comprises a stabilizer comprising one or more alcohols. Without wishing to be limited by theory, the stabilizer may help stabilize the DMMn oligomers by reacting with formaldehyde to form molecules that will reduce or prevent undesirable reactions in conditions that may be encountered in fuel distribution systems. It has been discovered that such compositions comprising alcohols of certain physical and chemical properties, as described further hereinbelow, in blends with dimethoxymethane oligomers in distillate fuels may have reduced cloud and/or pour points and/or increased fungibility relative to similar compositions absent the alcohol. Fungibility relates to the performance of a composition in fuel distribution and delivery systems. An indicator of fungibility is the increase of water phase volume when water is contacted with the fuel mixture, with a reduced increase of such water phase volume indicating a more fungible composition.

Without wishing to be limited by theory, the presence of the alcohol, in embodiments, promotes the formation of hemiformals, thus enhancing product composition properties by reducing formaldehyde content and associated reactions. The alcohol content of compositions according to certain embodiments of this disclosure may also increase the solubility of heavier oligomers (e.g., DMM 5+) in the composition.

Alcohol

Alcohols may be selected (e.g., alcohols having a certain boiling point), in embodiments, to provide certain product properties, such as flash point. In embodiments, the alcohol has a boiling point of greater than or equal to 100° C., 150° C., 160° C., 170° C., 180° C., 190° C., 200° C. or 210° C. In embodiments, the alcohol has a boiling point that is in the range of from 95° C. to 220° C., from 95° C. to 170° C., from 110° C. to 220° C., from 110° C. to 170° C., from 95° C. to 110° C., from 110° C. to 170° C., or from 170° C. to 220° C. Alcohols with low water solubility may be effective for increasing fungibility. In embodiments, the alcohol has a low water solubility, as indicated by a water solubility of less than or equal to 25 g/100 mL, 20 g/100 mL, 15 g/100 mL, 10 g/100 mL, 9 g/100 mL, 8 g/100 mL, 7 g/100 mL, 6 g/100 mL, 5 g/100 mL, or 4 g/100 mL at 20° C. In embodiments, the alcohol has a low water solubility, as indicated by a water solubility of less than or equal to 1 g/100 mL, 5 g/100 mL, or 10 g/100 mL at 30° C. In embodiments, the alcohol may be selected from isobutanol, cyclohexanol, 1-octanol, benzyl alcohol, phenylethanol, hexadecanol or a combination thereof. Alcohols based on renewable feedstocks, such as, without limitation, bio-butanol and/or higher carbon number bio-alcohol(s), may provide for renewable content, low solubility in water and appropriate volatility characteristics. Without wishing to be limited by theory, the stabilizer may enhance stabilization of one or more renewable additive(s) utilized in biodiesel. In embodiments, the stabilizer consists or consists essentially of the one or more alcohols.

In embodiments, a composition according to this disclosure comprises less than or equal to 10, 9, 8, 7, 6, 5, 4, 3, 2, or 1 volume percent alcohol. In embodiments, levels of free alcohol in compositions comprising mixtures of alcohol, DMMn, and distillate fuel are less than or less than or equal to 1 volume percent, less than or less than or equal to 3 volume percent, or less than or less than or equal to 5 volume percent. Higher levels of alcohol may also be utilized, in embodiments, provided the increased water phase volume, organic content of the water, product cost, as well as flash point for some alcohols, are acceptable, as such higher alcohol content may be useful for other properties, such as, without limitation, increasing the renewable content of the product composition, e.g., bio-butanol and/or higher carbon number bio-alcohol.

In embodiments, a composition according to this disclosure comprises a desired volume percentage of an oligomer portion comprising DMMn, and the desired percentage includes less than a desired vol. % DMM2 and/or less than a desired vol. % DMM5, with the remainder of the desired percentage comprising DMM3 and/or DMM4; and a desired volume percentage of alcohol. For example, in embodiments, a composition according to this disclosure comprises 5 vol. % of an oligomer portion comprising DMMn, including less than 1 vol. % DMM2 and/or less than 2 vol. % DMM5, with the remainder of the desired volume percentage comprising DMM3 and/or DMM4; and less than 2 vol. % alcohol (e.g., phenylethanol). In embodiments, a composition according to this disclosure comprises less than or equal to 20 vol. % of an oligomer portion comprising DMMn, including less than 1 vol. % DMM2 and/or less than 2 vol. % DMM5, with the remainder of the desired percentage comprising DMM3 and/or DMM4; and less than 2 vol. % alcohol (e.g., phenylethanol). The remainder of the composition (e.g., greater than 93 vol. % in the first example above, and 78 vol. % in the second example above) may comprise a distillate fuel (e.g., including, without limitation, petroleum diesel, biodiesel, and/or synthetic diesel, with or without typical additives thereof).

In embodiments, a composition according to this disclosure does not comprise an emulsifying agent. For example, in embodiments, a composition according to this disclosure does not comprise oleic acid, ethyl ether, methyl benzoate, acetone, or a combination thereof. In embodiments, a composition according to this disclosure does not comprise DMM6+, i.e., does not comprise oligomers having a chain length n of greater than 5.

A composition according to this disclosure may have an increased cetane content, a reduced pour point, a reduced cloud point, and/or an increased flash point relative to a similar composition. In embodiments, the composition has a flash point of greater than or equal to 55° C., 65 C, or 75° C.

In embodiments, a composition according to this disclosure comprises an oligomer portion comprising oligomer(s) DMMn wherein n is greater than 4 (e.g., n is greater than or equal to 5, or 6, and so on). Such a composition may have a cetane content that is greater than or equal to the cetane content of a similar composition in which the oligomer portion does not comprise oligomer(s) wherein n is greater than 4. In embodiments, such a composition has a cloud point and/or a pour point that is within 5, 10, or 15% of the cloud point and/or pour point of a similar composition in which the oligomer portion does not comprise oligomer(s) wherein n is greater than 4.

In embodiments, a composition according to this disclosure comprises a distillate fuel, and less than or less than or equal to a desired maximum volume percent (e.g., less than or equal to 20, 15, 10, 9, 8, 7, 6, 5, 4, 3, 2, or 1 volume percent) of at least one dimethoxymethane oligomer DMMn, and such a composition has a cetane content that is within 5, 10, or 15% of the cetane content of a similar composition comprising greater than the desired maximum volume percent of the oligomer portion. In embodiments, such a composition has a cloud point and/or pour point that is within 5, 10, or 15% of the cloud point and/or pour point, respectively, of a similar composition comprising greater than the desired maximum volume percent of the oligomer portion.

In embodiments, a composition according to this disclosure exhibits a water phase volume increase that is no more than 10, 30, or 50% greater than a water phase volume increase of a similar composition. For example, in embodiments, a composition according to this disclosure comprises an alcohol, and exhibits a water phase volume increase that is no more than 10, 30%, or 50% greater than a water phase volume increase of the same composition absent the alcohol. In embodiments, a composition according to this disclosure comprises an alcohol, and exhibits a reduced free formaldehyde content relative to a free formaldehyde content of the same composition absent the alcohol.

In embodiments, a composition according to this disclosure comprises less than or less than or equal to a desired maximum volume percentage (e.g., 20, 15, 10, 9, 8, 7, 6, 5, 4, 3, 2, or 1 volume percent) of an oligomer portion comprising at least one dimethoxymethane oligomer DMMn, and exhibits a water phase volume increase that is at least 50, 30, or 10% less than a water phase volume increase of a similar composition comprising greater than the maximum desired volume percent of the oligomer portion.

In embodiments, the water phase volume increase of a composition according to this disclosure is less than or equal to 15, 25, or 35 volume percent, or in the range of from 0 to 100, from 10 to 15, from 10 to 20, from 15 to 20, or from 10 to 30 volume percent.

Also provided herein is a method of forming a fuel composition. The method of forming a fuel composition comprises separating, from a mixture of DMMn oligomers, one or more DMMn fractions comprising DMMn oligomers having a specific chain length n, and combining a desired amount of one or more of the separated DMMn fractions with a distillate fuel to provide a fuel composition of the type disclosed herein. The one or more DMMn fractions may be combined to provide a specific distribution and/or amount of DMMn oligomers in the oligomer portion of the composition, such distributions and amounts as described hereinabove.

A method I according to this disclosure is depicted in the schematic of the FIGURE. The method comprises, at 10, separating one or more DMMn fractions comprising DMMn oligomers having a specific chain length n from a mixture of DMMn oligomers. The method may further comprise, at 20, providing a stabilizer comprising one or more alcohols, such as described hereinabove. The method further comprises, at 30, combining desired amounts of the one or more separated DMMn fractions with a distillate fuel, and optionally the stabilizer, to provide the fuel composition.

For example, in embodiments, DMM2, DMM3, DMM4, and/or DMM5 fractions may be separated from a mixture comprising DMMn oligomers, and desired amounts of the separated DMM2 fraction, DMM3 fraction, DMM4 fraction, and/or DMM5 fraction may be combined with a distillate fuel to provide the fuel composition. In embodiments, DMM2, DMM3, DMM2-5, DMM3-5, DMM3-4, DMM4, and/or DMM5 fractions may be separated from a mixture comprising DMMn oligomers, and desired amounts of the separated DMM2 fraction, DMM3 fraction, DMM2-5, DMM3-5, DMM3-4, DMM4, and/or DMM5 fraction may be combined with a distillate fuel to provide the fuel composition. The DMMn fractions may be mixed to provide a desired oligomer portion prior to combining the oligomer portion with the distillate fuel. Alternatively or additionally, the DMMn fractions may be combined with the distillate fuel separately.

In embodiments, as noted in the FIGURE, the method further comprises providing a stabilizer comprising one or more alcohols, and combining the stabilizer with the one or more DMMn fractions and/or with the distillate fuel to provide the fuel composition. In such embodiments, the stabilizer may be combined with one or more of the separated DMMn fractions prior to combination with the distillate fuel, may be combined with the distillate fuel prior to combination with the one or more separated DMMn fractions, or may be combined concurrently with the distillate fuel. The one or more DMMn fractions and/or the stabilizer may be combined with the distillate fuel to provide the amounts and or ratios thereof described hereinabove with reference to the fuel composition.

Compositions of this disclosure comprising alcohols of certain physical and chemical properties in blends of dimethoxymethane oligomers in distillate fuels may provide for reduced cloud point and/or pour point and/or increased fungibility relative to similar compositions lacking the alcohol. As described hereinabove, alcohols with low water solubility may be effective for increasing fungibility. Additionally, the alcohol content may promote the formation of hemiformals, thus potentially improving product properties by reducing formaldehyde content and/or associated reactions. The alcohol content of the herein-disclosed compositions comprising alcohol(s) may also increase the solubility of heavier oligomers in the composition.

This disclosure also provides compositions comprising specific ranges of chain lengths of the dimethoxymethane oligomers (DMMn) in combination with distillate fuel(s). Rather than utilizing 100% DMMn wherein n is equal to 3 or 4, compositions according to some embodiments of this disclosure include higher levels of oligomers where n is greater than 4. Such compositions may provide for increased cetane content relative to similar compositions comprising primarily or consisting essentially of oligomers where n is less than or equal to 4, while retaining other properties appropriate for blending with distillates such as diesel. These compositions may further comprise alcohol(s) as described above.

This disclosure also provides product compositions with reduced percentages of DMMn than conventionally employed. For example, such compositions according to this disclosure may comprise less than a maximum desired volume percent (e.g., 20, 15, 10, 9, 8, 7, 6, 5, 4, 3, 2, or 1 volume percent) of DMMn's in blends of DMMn in distillate fuels. Compositions comprising such DMMn volume percentages (e.g., below 10 volume percent, in embodiments) may provide increased fungibility and exhibit properties that more closely approximate conventional diesel than similar compositions comprising higher levels of DMMn's. The features and benefits noted above for compositions comprising alcohols and/or specific DMMn chain length ranges (e.g., DMMn where n is greater than 4) may also be provided by these compositions with percentages of DMMn below a maximum desired volume percent in blends of alcohol(s) and/or specific ranges of DMMn chain lengths in distillate fuels.

In embodiments, a fuel composition according to this disclosure comprises a distillate fuel, an oligomer portion comprising at least one dimethoxymethane oligomer (DMMn), and an alcohol having a low water solubility, and at least one of the distillate fuel and the alcohol is partially or wholly a renewable fuel component. The fuel composition may further comprise at least one non-renewable fuel component. In embodiments, the at least one non-renewable fuel component provides a product advantage of the at least one renewable fuel component in the composition, the at least one renewable fuel component in the composition provides a product advantage for the at least one non-renewable fuel component in the composition, or both. In embodiments, the at least one DMMn is derived, partially or wholly, from renewable material, and/or otherwise contains renewable material. Such renewable material may include, without limitation, fatty acid methyl esters and the like.

In embodiments, product advantages provided via the compositions according to this disclosure may include reduced emissions, increased cetane content, enhanced fungibility, enhanced stability, reduced engine component fouling, or a combination thereof.

The following examples merely illustrate the system and method of this disclosure. Those skilled in the art will recognize many variations that are within the spirit of this disclosure and the scope of the claims.

EXAMPLES

Example 1: Product Compositions Comprising DMMn, Alcohol, and Distillate Fuel

Product compositions according to this disclosure were formed by combining an amount of alcohol with a blend containing 20 volume percent DMMn and 80 volume percent diesel. The DMMn comprised less than 1% DMM2, 12% DMM3, 7% DMM4, and less than 1% DMM5. Product composition PC1 comprised 2 volume percent isobutanol, while product composition PC2 comprised 4 volume percent isobutanol. A comparative sample C1 comprised no alcohol.

The samples were evaluated to determine the flash point (° C.), the cloud point (° C.), the pour point (° C.), and the volume percent water phase increase. The flash point was determined according to ASTM D93. The cloud point was determined according to ASTM D2500. The pour point was determined according to ASTM D97. The water phase increase was determined utilizing a graduated cylinder. Results of these experiments are provided in Table 1 hereinbelow. As can be seen from the results in Table 1, the incorporation of the alcohol provides, according to temperature at which vapor first forms during a simulation, for a flash point that is within 10° C. and 20° C., for product compositions PC1 and PC2, respectively, of the flash point of comparative sample C1 that contains no alcohol. The incorporation of the alcohol provided for a cloud point that was, based on visual observation, similar for product compositions PC1 and PC2 and comparative sample C1 that contained no alcohol. The incorporation of the alcohol in product composition PC2 resulted in water phase increase that was 7 vol. % less than the water phase increase exhibited by comparative sample C1.

TABLE 1

Data From Example 1

| Sample ID | Alcohol | Amount of Alcohol (Vol. %) | Flash Point (° C.) | Cloud Point (Visual Observation) | Water Phase Increase (Vol. %) |
|---|---|---|---|---|---|
| C1 | None | 0 | >170 | No Haze | 30 |
| PC1 | Isobutanol | 2 | >160 | No Haze | — |
| PC2 | Isobutanol | 4 | >150 | No Haze | 23 |

Example 2: Product Compositions Comprising Distillate Fuel and Specific Ranges of DMMn Product Compositions According to this Disclosure were Formed by Combining DMMn's of specific chain length ranges to form blended compositions comprising 20 volume percent of the specific range DMMn oligomer portion and 80 volume percent diesel. These compositions comprised no alcohol, although as noted hereinabove, compositions comprising such specific DMMn chain length ranges may further comprise alcohol(s). Product composition PC3 comprised 20 volume percent of DMM having chain lengths in the range of from 2-5 (i.e., DMM2-5), while comparative sample C2 comprised conventional DMM having chain lengths in the range of 3-4 (i.e., DMM3-4).

The samples were evaluated to determine the flash point (° C.), the cloud point (° C.), and the pour point (° C.), as described with reference to Example 1 hereinabove. Additionally, the cetane number of the samples was determined according to ASTM D613. Results of these experiments are provided in Table 2 hereinbelow.

TABLE 2

Data From Example 2

| Sample ID | Oligomer Range | DMMn (Vol. %) | Cetane Number | Flash Point (° C.) | Cloud Point (° C.) |
|---|---|---|---|---|---|
| PC3 | DMM2-5 | 20 | — | >140 | — |
| C2 | DMM3-4 | 20 | 50 | >170 | −2 |

Example 3: Product Composition Comprising Distillate Fuel and Specific Maximum Desired Total Amount of DMMn A product composition according to this disclosure was formed by combining a reduced amount (i.e., less than 10 volume percent) of DMMn with 90 volume percent diesel. This composition comprised no alcohol, although as noted hereinabove, compositions comprising such reduced total volume of DMMn may further comprise alcohol(s) as in Example 1, and/or may comprise a specific chain length range(s) of DMMn as in Example 2. Product composition PC4 comprised 20 total volume percent of DMMn, while product composition PC5 comprised less than 10 total volume percent of DMMn. Product compositions PC4 and PC5 comprised DMMn having chain lengths in the range of 2-5.

The samples were evaluated to determine the water phase volume increase, as described with reference to Example 1 hereinabove. Results of these experiments are provided in Table 3 hereinbelow. As can be seen from the results in Table 3, the product composition PC5 comprising reduced total volume percent of DMMn exhibited a reduced volume percent water phase increase than product composition PC4, which comprised the higher total volume percent DMMn. The water phase increase was 34.8% less for PC5 than for PC4.

TABLE 3

Data From Example 3

| Sample ID | DMMn (Vol. %) | Water Phase Increase (Vol. %) |
|---|---|---|
| PC4 | 20 | 23 |
| PC5 | <10 | <15 |

ADDITIONAL DISCLOSURE

The embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the illustrative embodiments disclosed above may be altered or modified and such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. For instance, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

A: A composition comprising: a distillate fuel; an oligomer portion comprising at least one dimethoxymethane oligomer; and a stabilizer comprising one or more alcohols.

B: A composition comprising: a distillate fuel; and an oligomer portion comprising at least one dimethoxymethane oligomer, DMMn, wherein n is less than 3 and/or greater than 4.

C: A composition comprising: a distillate fuel; and less than 10 volume percent of an oligomer portion, wherein the oligomer portion comprises at least one dimethoxymethane oligomer.

D: A method comprising: separating, from a mixture of DMMn oligomers, one or more DMMn fractions comprising oligomers of a desired chain length n; and combining a desired amount of one or more of the separated DMMn fractions with a distillate fuel to provide a fuel composition.

E: A fuel composition comprising: a distillate fuel, an oligomer portion comprising at least one dimethoxymethane oligomer (DMMn), and an alcohol having a low water solubility, wherein at least one of the distillate fuel and the alcohol is partially or wholly a renewable fuel component.

Each of embodiments A, B, C, D and E may have one or more of the following additional elements:
Element 1: wherein the composition has a cetane content that is greater than or equal to the cetane content of a similar composition in which the oligomer portion does not comprise at least one dimethoxymethane oligomer, DMMn, wherein n is greater than 4. Element 2: wherein the composition has a cloud point and/or a pour point that is within 5, 10, or 15% of the cloud point and/or pour point, respectively, of a similar composition in which the oligomer portion does not comprise at least one dimethoxymethane oligomer, DMMn, wherein n is greater than 4. Element 3: wherein the composition has a cetane content that is within 5, 10, or 15% of the cetane content of a similar composition comprising greater than 10 volume percent of the oligomer portion. Element 4: wherein the composition has a cloud point and/or a pour point that is within 5, 10, or 15% of the cloud point and/or pour point, respectively, of a similar composition comprising greater than 10 volume percent of the oligomer portion. Element 5: wherein the composition exhibits a water phase volume increase that is in the range of from exhibits a water phase volume increase that is in the range of from 0 to 100 volume percent, or 10 to 30 volume percent. Element 6: further comprising: a stabilizer comprising one or more alcohols. Element 7: wherein the alcohol has a boiling point of greater than or equal to 95° C., 100° C., or 105° C., or in the range of from 95° C. to 220° C., from 100° C. to 220° C., or from 105° C. to 220° C. Element 8: wherein the alcohol has a low water solubility, as indicated by a water solubility of less than or equal to 25 g/100 mL, 20 g/100 mL, or 15 g/100 mL at 20° C. Element 9: wherein the alcohol is selected from isobutanol, cyclohexanol, 1-octanol, benzyl alcohol, phenylethanol, hexadecanol, or a combination thereof. Element 10: wherein the stabilizer consists essentially of the one or more alcohols. Element 11: comprising less than or equal to 10, 9, 8, 7, 6, 5, 4, 3, 2, or 1 volume percent alcohol. Element 12: wherein the composition exhibits a reduced free formaldehyde content relative to a free formaldehyde content of the same composition absent the alcohol. Element 13: comprising from greater than 0 to 2 volume percent of DMMn, wherein n is greater than 4. Element 14: comprising less than or equal to 1 volume percent DMM2. Element 15: wherein the oligomer portion consists essentially of DMM2, DMM3, DMM4, DMM5, or a combination thereof. Element 16: wherein the distillate fuel comprises diesel, jet fuel, kerosene, or a combination thereof. Element 17: wherein the composition has a flash point of greater than or equal to 55° C., 65° C., or 75° C. Element 18: comprising less than or equal to 10%, 9%, 8%, 7%, 6%, 5%, 4%, 3%, 2%, or 1 vol. % of the oligomer portion. Element 19: wherein the one or more DMMn fractions are selected from DMM2, DMM3, DMM4, DMM5, DMM3-4, DMM2-4, DMM5+, DMM2-5, DMM3-5, or combinations thereof. Element 20: further comprising combining one or more of the separated DMMn fractions, the distillate fuel, or both with a stabilizer comprising one or more alcohols. Element 21: wherein the fuel composition comprises DMM3, DMM4, less than 2 vol. % DMM5, less than 1 vol. % DMM2, and less than 2 vol. % of the stabilizer. Element 22: wherein the fuel composition comprises less than 10 volume percent DMMn oligomers. Element 23: wherein the fuel composition comprises from greater than 0 to 2 volume percent DMMn, wherein n is greater than 4. Element 24: wherein the fuel composition further comprises at least one non-renewable fuel component, wherein the at least one non-renewable fuel component provides a product advantage of the at least one renewable fuel component in the composition, and/or vice versa. Element 25: wherein the product advantage comprises reduced emissions, increased cetane, enhanced fungibility, enhanced stability, or a combination thereof. Element 26: wherein the at least one renewable fuel component comprises one or more fatty acid methyl esters. Element 27: the at least one DMMn is derived, partially or wholly, from renewable material, or otherwise contains renewable material.

While certain embodiments have been shown and described, modifications thereof can be made by one skilled in the art without departing from the teachings of this disclosure.

Numerous other modifications, equivalents, and alternatives, will become apparent to those skilled in the art once the above disclosure is fully appreciated. It is intended that the following claims be interpreted to embrace such modifications, equivalents, and alternatives where applicable. Accordingly, the scope of protection is not limited by the description set out above but is only limited by the claims which follow, that scope including equivalents of the subject matter of the claims.

What is claimed is:

1. A composition comprising:
a distillate fuel;
a stabilizer comprising one or more alcohols; and
an oligomer portion comprising at least one dimethoxymethane oligomer, DMMn, wherein n is less than 3 and/or greater than 4, and
wherein the composition comprises 1 to 10 volume percent of the one or more alcohols.

2. The composition of claim 1, wherein the composition has a cetane content that is greater than or equal to the cetane content of a similar composition in which the oligomer portion does not comprise at least one dimethoxymethane oligomer, DMMn, wherein n is greater than 4.

3. The composition of claim 1, wherein the composition has a cloud point and/or a pour point that is within 15% of the cloud point and/or pour point, respectively, of a similar composition in which the oligomer portion does not comprise at least one dimethoxymethane oligomer, DMMn, wherein n is greater than 4.

4. The composition of claim 1 further comprising 2 to 10 volume percent of the one or more alcohols.

5. The composition of claim 4, wherein the alcohol has a boiling point of greater than or equal to 95° C.

6. The composition of claim 4, wherein the alcohol has a low water solubility, as indicated by a water solubility of less than or equal to 25 g/100 mL at 20° C.

7. The composition of claim 4, wherein the alcohol is selected from isobutanol, cyclohexanol, 1-octanol, benzyl alcohol, phenylethanol, hexadecanol, other alcohols of low water solubility or a combination thereof.

8. The composition of claim 4, wherein the stabilizer consists essentially of the one or more alcohols.

9. The composition of claim 4 comprising 2 to 9 volume percent of the one or more alcohols.

10. The composition of claim 4, wherein the composition exhibits a water phase volume increase that is in the range of from 0 to 100 volume percent.

11. The composition of claim 4, wherein the composition exhibits a reduced free formaldehyde content relative to a free formaldehyde content of the same composition absent the alcohol.

12. The composition of claim 1 comprising from greater than 0 to 2 volume percent of DMMn, wherein n is greater than 4.

13. The composition of claim 1 comprising less than or equal to 1 volume percent DMM2.

14. The composition of claim 1, wherein the oligomer portion consists essentially of DMM2, DMM5, and a combination thereof.

15. The composition of claim 1, wherein the composition has a flash point of greater than or equal to 55° C.

16. The composition of claim 1 comprising less than or equal to 10 vol. % of the oligomer portion.

17. A fuel composition comprising:
a distillate fuel, an oligomer portion comprising at least one dimethoxymethane oligomer (DMMn), and an alcohol having a low water solubility, wherein at least one of the distillate fuel and the alcohol is partially or wholly a renewable fuel component,
wherein the fuel composition comprises 1 to 10 volume percent of the alcohol.

18. The fuel composition of claim 17, further comprising at least one non-renewable fuel component, wherein the at least one non-renewable fuel component provides a product advantage for the at least one renewable fuel component in the composition, and/or vice versa.

19. The method of claim 18, wherein the at least one renewable fuel component comprises one or more fatty acid methyl esters.

20. The fuel composition of claim 17, wherein the at least one DMMn is derived, partially or wholly, from renewable material, or otherwise contains renewable material.

* * * * *